United States Patent
Berard et al.

(10) Patent No.: US 10,601,587 B2
(45) Date of Patent: Mar. 24, 2020

(54) METHOD, SERVER AND TELECOMMUNICATIONS SYSTEM FOR ESTABLISHING, THROUGH AN OTA SERVER, A SECURED COMMUNICATION CHANNEL BETWEEN AN ADMINISTRATIVE AGENT COMPRISED IN A DEVICE AND A THIRD PARTY SERVER

(71) Applicant: GEMALTO SA, Meudon (FR)

(72) Inventors: Xavier Berard, Gemenos (FR); Frédéric Paillart, Gemenos (FR); Frédéric Faure, Gemenos (FR); Lionel Mallet, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 400 days.

(21) Appl. No.: 15/321,251

(22) PCT Filed: Jun. 23, 2015

(86) PCT No.: PCT/EP2015/064134
§ 371 (c)(1),
(2) Date: Dec. 22, 2016

(87) PCT Pub. No.: WO2015/197631
PCT Pub. Date: Dec. 30, 2015

(65) Prior Publication Data
US 2017/0214524 A1   Jul. 27, 2017

(30) Foreign Application Priority Data
Jun. 24, 2014   (EP) .................................... 14305986

(51) Int. Cl.
*H04L 9/08* (2006.01)
*H04W 8/24* (2009.01)
(Continued)

(52) U.S. Cl.
CPC .......... *H04L 9/0819* (2013.01); *H04L 41/046* (2013.01); *H04L 63/166* (2013.01);
(Continued)

(58) Field of Classification Search
CPC ... H04L 9/0819; H04L 41/046; H04L 63/166; H04L 67/20; H04L 2209/80; H04W 8/245; H04W 12/06; H04W 12/04; H04W 84/12
See application file for complete search history.

(56) References Cited

U.S. PATENT DOCUMENTS

| 2002/0112152 A1* | 8/2002 | VanHeyningen | ......... H04L 9/12 713/151 |
| 2002/0194292 A1* | 12/2002 | King | ................... H04L 63/0281 709/213 |

(Continued)

FOREIGN PATENT DOCUMENTS

| WO | WO 2008/123827 A1 | 10/2008 |
| WO | WO 2009/046400 A1 | 4/2009 |

OTHER PUBLICATIONS

Chi et al., Agent Warehouse: A New Paradigm for Mobile Agent Deployment, Nov. 2002, IEEE International Conference on Tools with Artificial Intelligence, pp. 455-462 (Year: 2002).*

(Continued)

*Primary Examiner* — Kenneth W Chang
(74) *Attorney, Agent, or Firm* — Buchanan Ingersoll & Rooney PC

(57) ABSTRACT

A method for establishing a first secured communication channel between an administrative agent in a device and a distant server, the device comprising a secure element communicating with the administrative agent, the secure element being administrated through the administrative agent by the distant server, the administrative agent being administrated by a third party server through a second
(Continued)

Figure 1:
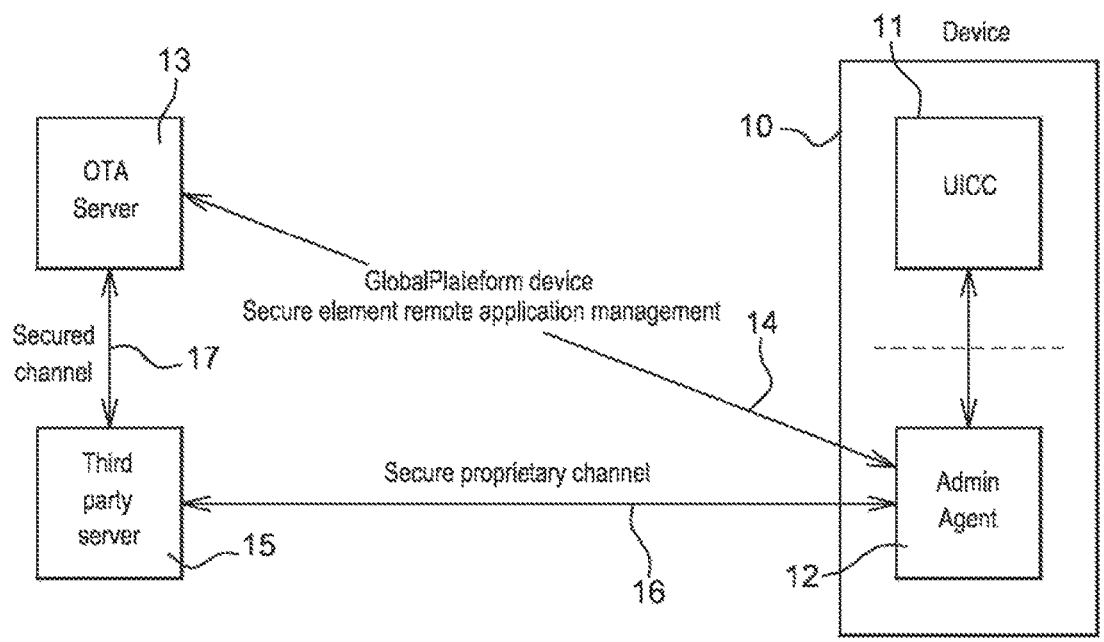

secured communication channel, the distant server and the third party server being connected through a third secured channel. The third party server requests, from the distant server, an operation on the secure element and a one-time PSK. The distant server sends, to the third party server, the one-time PSK. The third party server sends, to the administrative agent, a triggering message including the one-time PSK. A TLS-PSK handshake is performed between the administrative agent and the distant server with the one-time PSK to establish the first secured communication channel.

8 Claims, 1 Drawing Sheet

(51) Int. Cl.
*H04W 12/06* (2009.01)
*H04L 29/06* (2006.01)
*H04W 12/00* (2009.01)
*H04L 12/24* (2006.01)
*H04L 29/08* (2006.01)
*H04W 12/04* (2009.01)
*H04W 84/12* (2009.01)

(52) U.S. Cl.
CPC ............ *H04L 67/20* (2013.01); *H04W 8/245* (2013.01); *H04W 12/0023* (2019.01); *H04W 12/06* (2013.01); *H04L 2209/80* (2013.01); *H04W 12/04* (2013.01); *H04W 84/12* (2013.01)

(56) References Cited

U.S. PATENT DOCUMENTS

| | | | |
|---|---|---|---|
| 2008/0052770 A1* | 2/2008 | Ali .................... | G06F 21/34 726/9 |
| 2009/0100264 A1* | 4/2009 | Futa .................. | H04L 9/0844 713/170 |
| 2009/0172398 A1* | 7/2009 | Falk .................. | H04L 63/062 713/168 |
| 2009/0191857 A1 | 7/2009 | Horn et al. | |
| 2009/0209232 A1* | 8/2009 | Cha ................... | H04L 63/0428 455/411 |
| 2012/0190354 A1* | 7/2012 | Merrien ............ | H04W 4/70 455/422.1 |
| 2013/0160134 A1* | 6/2013 | Marcovecchio ... | G06Q 20/3563 726/26 |

OTHER PUBLICATIONS

International Search Report (PCT/ISA/210) dated Sep. 16, 2015, by the European Patent Office as the International Searching Authority for International Application No. PCT/EP2015/064134.

Written Opinion (PCT/ISA/237) dated Sep. 16, 2015, by the European Patent Office as the International Searching Authority for International Application No. PCT/EP2015/064134.

Gallas et al., "OMA-SCT-2007-0094R01-CR Multi Admin.doc; OMA-SCT-2007-0094R01-CR Multi Admin", Open Mobile Alliance (OMA), Dec. 2007, pp. 1-7, XP064022219, URL:ftp/Publicdocuments/ARCH/ARC-SEC SCT/2007/.

Kuo et al., "Comparison Studies between Pre-Shared and Public Key Exchange Mechanisms for Transport Layer Security", 25th IEEE International Conference on Computer Communications. Proceedings, Apr. 2006, pp. 1-6, XP031072092.

* cited by examiner

METHOD, SERVER AND TELECOMMUNICATIONS SYSTEM FOR ESTABLISHING, THROUGH AN OTA SERVER, A SECURED COMMUNICATION CHANNEL BETWEEN AN ADMINISTRATIVE AGENT COMPRISED IN A DEVICE AND A THIRD PARTY SERVER

The invention relates to telecommunications and in particular to the administration of a secure element cooperating with a device.

The device is typically a smartphone, a PDA, a tablet, a mobile phone or a machine (for M2M applications) like a car for example.

The secure element is for example a UICC (Universal Integrated Circuit Card), can be in the format of a smart card, or in the format of a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. In a LTE network (4G), the UICC contains a ISIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS devices, and will work in all three cases.

In 2G networks, the SIM card and SIM application were bound together, so that "SIM card" could mean the physical card, or any physical card with the SIM application.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications (e.g. following the form factor indicated in the ETSI TS 102 671). The same objective is reached when a chip (a secure element) containing the SIM, ISIM or USIM applications and files is contained in the terminal. The chip is for example soldered to the mother-board of the terminal or machine and constitutes an UICC.

Other secure elements are possible, for example eUICCs. eUICCs are UICCs that are either soldered either not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. TS 102 671 also applies to eUICCs The same applies when a UICC is integrated in a machine that is not intended to be opened. The GSMA provides a technical specification for eUICCs.

In the next description, we will refer in general to secure elements that can be UICCs, eUICCs, embedded secure elements (soldered to a motherboard of the device), secure memory cards or micro SD cards for example. These secure elements can be administrated by operators via OTA (Over The Air).

The operator's network (OTA platform) can administrate the secure element through an administrative agent located in the device (admin agent). This is typically the case when the secure element cannot open a data channel to communicate with the OTA platform (the device is not BIP compliant for example). It is then necessary to provide in the device an admin agent for establishing a data channel between the secure element and the OTA platform.

In the following, a telecommunications system as represented in FIG. 1 will be considered.

In this figure, a device 10, for example a smartphone, contains a secure element 11 (here a UICC) and an administrative agent 12. The secure element 11 communicates with the administrative agent 12.

The secure element 11 is administrated by a distant server 13 (here an OTA server) through the administrative agent 12. This administration is done through a first secure channel 14 as defined in "GlobalPlatform Device Secure Element Remote Application Management", for example version 1.0, May 2011 document referenced GPD_SPE_008.

The administrative agent 12 is administrated by a third party server 15 through a second secured channel 16, the distant server 13 and the third party server 15 being connected through a third secured channel 17.

The third party server 15 is for example an an administration system of a device maker, a service provider, a TSM, or a bank system that is managing an NFC application present in the device 10 (in a secure element as mentioned above). It can also be an administration system of a device maker, like a car maker.

The problem solved by the present invention is related to the establishment of the first secure channel 14 between the distant server 13 and the admin agent 12, as defined in GlobalPlatform Device Secure Element Remote Application Management.

Authentication mechanisms are already proposed in the GlobalPlatform Device Secure Element Remote Application Management, for example version 1.0, May 2011, document referenced GPD_SPE_008. These mechanisms are:
- TLS mutual authentication using PSK-TLS (see RFC 4279 [10a], RFC 4785 [10c], and RFC 5487 [10b]).
- TLS mutual authentication TLS using Public Keys based on client certificates (see RFC 2246 [8a], RFC 4346 [8b], and RFC 5246 [8c]).
- TLS with only server authentication to manage the confidentiality and the integrity (for confidentiality) and then HTTP Basic or Digest Authentication for the client authentication (see RFC 2617 [12]) (for authentication using login password mechanism).

All these methods require basically having credentials stored at device 10 side.

We could also imagine that the admin agent 12 doesn't authenticate itself because at the end the payload that will be returned by the distant server 13 in the HTTP response is secured itself but then the solution would be open to at least DoS attack (Deny of Service).

The technical problem to solve is therefore double:
  Firstly, there is a security issue: Sensible credentials required to establish the communication channel 14 need to be stored in a very unsecured environment which is the device 10;

Secondly, there is a provisioning issue: Most of the time admin agent 12 and the distant server 13 are provisioned and operated by distinct entities and de-correlated of the final target which is the secure element 11 to administrate. So initializing a shared secret becomes very difficult, or almost impossible. So the credentials becomes something like a generic user/password being the same for all admin agent instances, which makes the first security issue even more critical.

The present invention has the purpose to propose a solution to these problems.

More precisely, the present invention proposes to establish a secured communication channel as defined in GlobalPlatform Device Secure Element Remote Application Management between a distant server, like an OTA server for example, and a secure element comprised in a device, through an admin agent comprised in this device, without having to store credentials at the level of the device or having to manage secrets between the distant server and a third party server that is administrating the admin agent. This secured communication channel must ensure integrity, authenticity and confidentiality.

This objective is achieved thanks to a method for establishing a first secured communication channel between an administrative agent comprised in a device and a distant server, the device comprising a secure element communicating with the administrative agent, the secure element being administrated through the administrative agent by the distant sewer, the administrative agent being administrated by a third party server through a second secured communication channel, the distant server and the third party server being connected through a third secured channel, the method consisting in:

a—Requesting, from the third party server to the distant server, an operation on the secure element and a one-time PSK;

b—Sending from the distant server to the third party server this one-time PSK;

c—Sending from the third party server to the administrative agent a triggering message including this one-time PSK;

d—Performing a TLS-PSK handshake between the administrative agent and the distant server with the one-time PSK in order to establish the first secured communication channel.

Thus, admin agent authentication is based on a one-time PSK generated by the distant server in the configuration of FIG. 1.

Preferably, the device is a mobile terminal.

Advantageously, the secure element is a UICC, a eUICC, an embedded secure element, a secure memory cards or a micro SD card.

Step—a—is preferably performed when the device is under Wifi coverage.

In a preferred embodiment, the distant server is an OTA server or a server specified in the GSMA eUICC specification.

The invention also concerns a server for administrating a secure element comprised in a device, the device comprising an administrative agent, the server being able to administrate the secure element through this administrative agent, the server comprising means for:

sending a one-time PSK to a third party server, at the request of this third party server;

performing a TLS-PSK handshake with the administrative agent, once the third party server has sent to the administrative agent the one-time PSK, in order to administrate the secure element.

The invention also concerns a third party server connected to a distant server able to administrate a secure element comprised in a device through an administrative agent comprised in the device, the administrative agent being administrated by the party server through a second secured channel, the distant server and the third party server being connected through a third secured channel, the third party server comprising means for:

a—Requesting to the distant server, an operation on the secure element and a one-time PSK;

b—Receiving from the distant server the one-time PSK;

c—Sending to the administrative agent a triggering message including the one-time PSK, in order to perform a TLS-PSK handshake between the administrative agent and the distant server with the one-time PSK, in order to establish a first secured communication channel between the administrative agent and the distant server.

Finally, the invention concerns a telecommunications system comprising:

a device comprising a secure element and an administrative agent, the secure element communicating with the administrative agent;

a distant server able to administrate the secure element via the administrative agent through a first secured communication channel, a third party server able to administrate the administrative agent through a second secured communication channel, the distant server and the third party server being connected through a third secured channel, the system comprising means for:

Requesting, from the third party server to the distant server, an operation on the secure element and a one-time PSK;

Sending from the distant server to the third party server the one-time PSK;

Sending from the third party server to the administrative agent a triggering message including the one-time PSK;

Performing a TLS-PSK handshake between the administrative agent and the distant server with the one-time PSK in order to establish the first secured communication channel.

Figure 2:
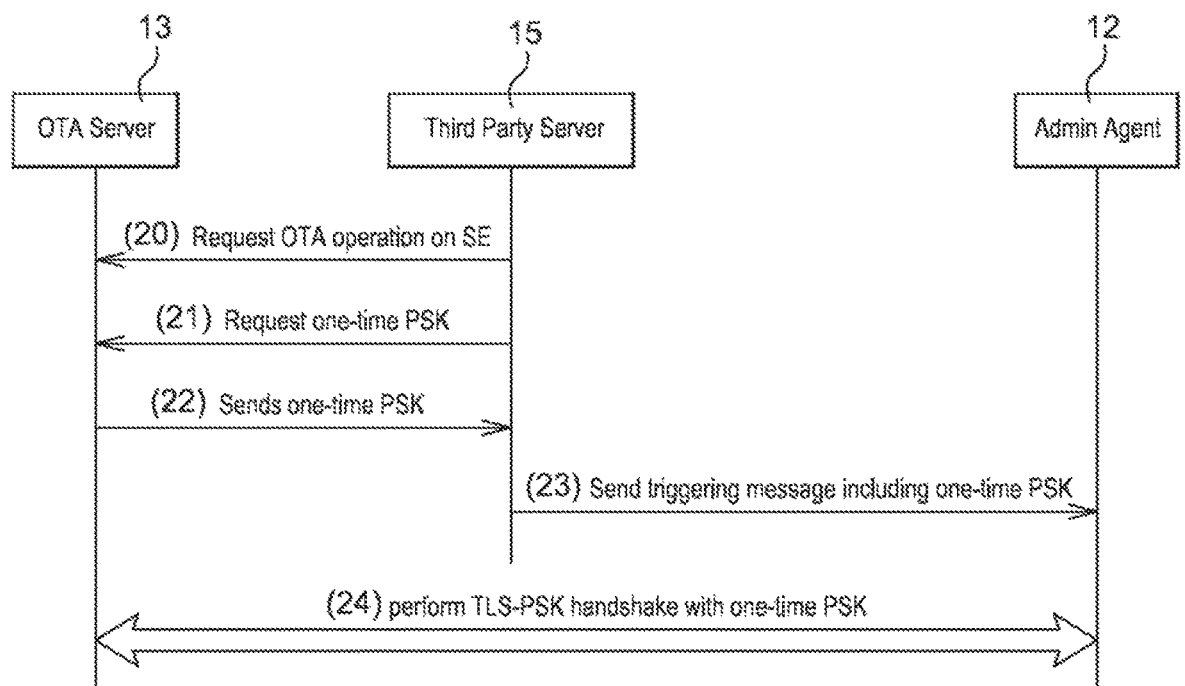

Other features and advantages of the present invention will appear in the following description of the figures that represent:

FIG. 1, a system according to the present invention;

FIG. 2, the method according to the present invention.

As already explained in regard to FIG. 1, the distant server 13 and the secure element 11 are owned and administrated by an actor 1 (typically a telecommunication network operator) through a first secured channel 14. The third party server 15 and the admin agent 12 are owned and administrated by an actor 2 (for example a bank, a TSM (Trusted Service Manager) or a manufacturer of the device 10) through a second (proprietary) secured channel 16. All these channels provide integrity, authenticity and confidentiality to the communications.

The connection (third channel 17) between the distant server 13 and the third party stirrer 15 is trusted and secured also.

FIG. 2 represents a flowchart explaining the method according to the present invention.

Only the distant server 13, the third party server 15 and the admin agent 12 are represented in this figure. The secure element 11 (FIG. 1) is administrated by the distant server 13 through the admin agent 12 to which it is connected. The admin agent 12 constitutes therefore a proxy.

The method according to the invention consists in four main steps:

The first step, referenced 20, consists in requesting, from the third party server 15 to the distant server 13, an operation on the secure element and a one-time PSK (Pre-Shared Key). The request of a one-time PSK can be done during step 20 or during another following step 21. The third party server 15 provides identification of the admin agent 12 and identification of the final targeted secure element that is behind the admin agent 12.

The second step, referenced 22, consists in sending from the distant server 13 to the third party server 15 a one-time PSK (and associated PSK_ID).

These communications occur on the third secured channel 13 (FIG. 1).

The third step, referenced 23, consists in sending from the third party server 15 to its administrative agent 12 a triggering message including at least the one-time PSK and associated PSK_ID, using the secured proprietary channel 16 (FIG. 1). This triggering message can be a conventional SMS containing the one-time PSK.

It is also possible to establish a voice communication with the admin agent 12 and to send from the third party server 15 the one-time PSK in the form of a speech signal.

The fourth step, referenced 24, consists in performing a TLS-PSK handshake between the administrative agent 12 and the distant server 13 with the received one-time PSK in order to establish the first secured communication channel (referenced 14 in FIG. 1). The TLS-PSK handshake is done in the same way it would have been done with an admin agent comprised in the secure element using the provided one-time PSK and PSK_ID.

After the TLS-PSK handshake, the first secured communication channel 14 is established and the distant server 13 can administrate the secure element 11 through the admin agent 12. This channel is secured and the secure element 11 to be administrated and the corresponding admin agent have been authenticated with a high security level.

The one-time PSK is a PSK that is valid only for establishing a unique communication channel (the one-time PSK changes at each request from the third party server 15 and is used for deriving the TLS session key).

TLS (Transport Layer Security) is a protocol used in Internet communication security. The TLS-PSK protocol is designed to implement TLS by using a pre-shared symmetric key, instead of using a public key certificate, and to avoid a complicated calculation necessary for an authentication process using a public key. The TLS and the TLS-PSK protocols are respectively defined in Request for Comments (RFC) 4346 and RFC 4279.

The distant server 13 and the third party server 15 can be a single entity.

In a preferred embodiment, the device 10 is a mobile terminal, like a mobile phone, a smartphone or a tablet for example.

The secure element 11 can be a UICC, a eUICC, an embedded secure element, a secure memory cards or a micro SD card.

In the scope of the invention, it s the third party server 15 that is at the origin of the establishment of the administration of the secure element 11 by the distant server 13. The trigger of the administration can be based on time or location of the device 10. The trigger of the administration can also be initiated by the Admin Agent to the third party server 15. For example, the third party server 15 can decide that an administration of the secure element 11 should happen when the device 10 is under Wifi coverage. This permits to lower the quantity of signals to be sent over the air since administration via Wifi is done in http (fixed phone lines). It is then not necessary that the device 10 be in data mode. It is also possible to decide, at the level of the distant server 13, that a communication with the secure element 11 has to be established (for example in the scope of a campaign), and to ask to the third party server 15 to request a one-time PSK. The admin agent 12 can also inform the third party server 15 that it is ready for establishing the first secure channel 14.

The distant server 13 is preferably an OTA server. It can also be a eUICC server as specified in GSMA eUICC document or any future ETSI/3GPP related specifications.

The invention also concerns a server 13 for administrating a secure element 11 comprised in a device 10, the device 10 comprising an administrative agent 12, the server 13 being able to administrate the secure element 11 through the administrative agent 12, this server comprising means for:
  sending a one-time PSK to the third party server 15, at the request of this third party server 15;
  performing a TLS-PSK handshake with the administrative agent 12, once the third party server 15 has sent to the administrative agent 12 the one-time PSK, in order to administrate the secure element 11.

The invention also concerns such a third party server 15 connected to a distant server 13 able to administrate a secure element 11 comprised in a device 10 through an administrative agent 12 comprised in the device 10, the administrative agent 12 being administrated by the third party server 15 through a second secured channel 16, the distant server 13 and the third party server 15 being connected through a third secured channel 17, the third party server 15 comprising means for:
  a—Requesting to the distant server 13, an operation on the secure element 11 and a one-time PSK;
  b—Receiving from the distant server 13 the one-time PSK;
  c—Sending to the administrative agent 12 a triggering message including the one-time PSK, in order to perform a TLS-PSK handshake between the administrative agent 12 and the distant server 13 with the one-time PSK, in order to establish a first secured communication channel 14 between the administrative agent 12 and the distant server 13.

Finally, the invention also concerns a telecommunications system comprising:
  a device 10 comprising a secure element 11 and an administrative agent 12, the secure element 11 communicating with the administrative agent 12;
  a distant server 13 able to administrate the secure element 11 via the administrative agent 12 through a first secured communication channel 14,
  a third party server 15 able to administrate the administrative agent 12 through a second secured communication channel 16, the distant server 13 and the third party server 15 being connected through a third secured channel 17, the system comprising means for:
  Requesting, from the third party server 15 to the distant server 13, an operation on the secure element 11 and a one-time PSK;
  Sending from the distant server 13 to the third party server 15 the one-time PSK;
  Sending from the third party server 15 to the administrative agent 12 a triggering message including the one-time PSK;

Performing a TLS-PSK handshake between the administrative agent 12 and the distant server 13 with the one-time PSK in order to establish the first secured communication channel 14.

The invention avoids having several authentication schemes being implemented in the distant server 13, avoids storing any credential from the distant server 13 on the admin agent 12 side, avoids any complex provisioning schema and provides a good level of authentication.

The invention claimed is:

1. A method for establishing a first secured communication channel between an administrative agent comprised in a device and a distant server, said device comprising a secure element communicating with said administrative agent, said secure element being administrated through said administrative agent by said distant server, said administrative agent being administrated by a third party server through a second secured communication channel, said distant server and said third party server being connected through a third secured channel, said method comprising:
   a—Requesting, from said third party server to said distant server, an operation on said secure element and a one-time PSK;
   b—Sending from said distant server to said third party server said one-time PSK;
   c—Sending from said third party server to said administrative agent a triggering message including said one-time PSK; and
   d—Performing a TLS-PSK handshake between said administrative agent and said distant server with said one-time PSK in order to establish said first secured communication channel.

2. The method according to claim 1, wherein said device is a mobile terminal.

3. The method according to claim 1, wherein said secure element is a UICC, a eUICC, an embedded secure element, a secure memory card or a micro SD card.

4. The method according to claim 1, wherein step—a—is performed when said device is under Wifi coverage.

5. The method according to claim 1, wherein said distant server is an OTA server or a server specified in the GSMA eUICC specification.

6. A server for administrating a secure element comprised in a device, said device comprising an administrative agent, said server being configured to administrate said secure element through said administrative agent, wherein said server comprises:
   means for sending a one-time PSK to a third party server, at the request of said third party server; and
   means for performing a TLS-PSK handshake with said administrative agent, once said third party server has sent to said administrative agent said one-time PSK, in order to administrate said secure element.

7. A third party server connected to a distant server configured to administrate a secure element comprised in a device through an administrative agent comprised in said device, said administrative agent being administrated by said third party server through a second secured channel, said distant server and said third party server being connected through a third secured channel, said third party server comprising:
   means for requesting, to said distant server, an operation on said secure element and a one-time PSK;
   means for receiving, from said distant server, said one-time PSK; and
   means for sending, to said administrative agent, a triggering message including said one-time PSK, in order to perform a TLS-PSK handshake between said administrative agent and said distant server with said one-time PSK, in order to establish a first secured communication channel between said administrative agent and said distant server.

8. A telecommunications system comprising:
   a device comprising a secure element and an administrative agent, said secure element configured to communicate with said administrative agent;
   a distant server configured to administrate said secure element via said administrative agent through a first secured communication channel,
   a third party server configured to administrate said administrative agent through a second secured communication channel, said distant server and said third party server being connected through a third secured channel, said system comprising:
   means for requesting, from said third party server to said distant server, an operation on said secure element and a one-time PSK;
   means for sending, from said distant server to said third party server, said one-time PSK;
   means for sending, from said third party server to said administrative agent, a triggering message including said one-time PSK; and
   means for performing a TLS-PSK handshake between said administrative agent and said distant server with said one-time PSK in order to establish said first secured communication channel.

* * * * *